United States Patent [19]
Holtz

[11] Patent Number: 5,917,948
[45] Date of Patent: Jun. 29, 1999

[54] IMAGE COMPRESSION WITH SERIAL TREE NETWORKS

[76] Inventor: Klaus Holtz, 631 O'Farrell #710, San Francisco, Calif. 94109

[21] Appl. No.: 08/643,774

[22] Filed: May 6, 1996

[51] Int. Cl.$^6$ .......................................................... G06K 9/36
[52] U.S. Cl. ............................ 382/232; 382/240; 395/410
[58] Field of Search ...................................... 382/232, 240; 348/417, 426; 395/410, 601

[56] References Cited

U.S. PATENT DOCUMENTS

| | | | |
|---|---|---|---|
| 4,366,551 | 12/1982 | Holtz | 364/900 |
| 4,992,868 | 2/1991 | Holtz | 358/135 |
| 5,113,505 | 5/1992 | Holtz | 395/400 |

OTHER PUBLICATIONS

Klaus Holtz, Here Comes the Brain–Like Self–Learning No Programming Computer of the Future, pp. 78–88, (unknown date).

Klaus Holtz–Packet Video Transmission on the Information Superhighway Using Image Content–Dependent Autosophy Video Comp.

Klaus Holtz–Digital Image and Video Compression for Packet Networks, 1995, pp. 17–1 to 17–20 (unknown month).

Primary Examiner—Jose L. Couso
Assistant Examiner—Anh Hong Do

[57] ABSTRACT

A new kind of Autosophy television is based on a new mathematical theory of "learning" and a new information theory. Unlike in conventional television the transmission bandwidth depends only on the image "content", such as "novelty" and "movement" within the images. Hardware parameter, such as: image size, resolution or scanning rates, become irrelevant. Television images are compared with image fragments stored in a special hyperspace tree library. The largest matching image fragments are encoded into digital "superpixel" codes each of which may contain any size image portion. Only the moving portions in the images are selected for encoding and transmission. The new television is especially suitable for the new packet switching networks, such as ATM, Internet or the Information Superhighway. The transmission protocol can be independent of hardware standards to allow television technology to evolve into larger screens and better image resolution while maintaining a universal backward compatible transmission format.

8 Claims, 7 Drawing Sheets

IMAGE COMPRESSION WITH SERIAL TREE NETWORKS

BACKGROUND, DESCRIPTION OF PRIOR ART

1. Field of the Invention

This invention relates to lossless image compression algorithms.

2. Description of the Prior Art

Both static graphics images or moving television images can be compressed using either the classical Shannon Information theory (Reference: C. E. Shannon, A mathematical Theory of Communications) or the newer Autosophy information theory (Reference: K. Holtz, Hyperspace storage compression for Multimedia systems, IS&T/SPIE Paper 2188-40, U.S. Pat. Nos. 4,992,868 and 4,366,551).

In a classical Shannon type image transmission, shown in FIG. 1, the required data volume or bandwidth is determined by hardware parameter, such as: rows, columns, brightness resolution and scanning rates. The image content, or what is shown on the screen, is irrelevant. In a digital image transmission the bandwidth can be calculated as the product of: pixel rows, pixel columns, colors, brightness resolution and scanning rates. The image information is scanned out, pixel by pixel, where each pixel must be separately defined in the transmission. A totally random noise pattern requires just as many bits per second for transmission as a blank screen. Any attempt of image compression, or to remove bits in the transmission, must lead to inevitable image distortions. The image distortions will increase with the compression until the image quality becomes unacceptable to the user. The only recourse is to attempt to hide these image distortions from the human observer. Shannon's information theories result in "lossy" image compression methods including the known JPEG or MPEG cosine transforms, wavelets or fractal compression.

A new Autosophy information theory was first proposed by the inventor Klaus Holtz in 1974 and first disclosed in a patent application in 1975 which later lead to U.S. Pat. No. 4,366,551. The theory is based on a prior mathematical theory of "learning" which includes six different self learning "Omni Dimensional Networks" or learning modes. An image compression scheme based on "parallel" omni dimensional networks is disclosed in U.S. Pat. No. 4,992,868. Data compression schemes based on "serial" omni dimensional networks are now used in the V.42bis compression standard which can sometimes double the transmission rates in modems. Later slight variations to the serial omni dimensional networks are known as the Lempel Ziv 78 (LZ-78) code (Reference U.S. Pat. No. Eastman 4,464,650) and the Lempel Ziv Welch (LZW) code (Reference Welch U.S. Pat. No 4,558,302). The LZW code is already used for image compression but with very disappointing results. An image compression scheme using "serial" omni dimensional networks, very similar to the present invention, was disclosed in 1995 (Reference: Klaus Holtz, Packet Video Transmission on the Information Superhighway Using Image Content Dependent Autosophy Video Compression, IS&T's 48th Annual Conference, Washington D.C., May 7, 1995) In an Autosophy type image transmission, shown in FIG. 2, the required data volume or bandwidth is determined only by the image content, such as novelty and movement in the images. The hardware parameter, such as: image size, resolution or scanning rates, become irrelevant. Autosophy information theories re-define "information" as something which is not already known by the receiver. Anything already known by the receiver is redundant and need not be transmitted again. This may lead to great "lossless" image compression which does not distort the images. Similar methods may compress still images or moving television images. The new image transmission schemes are especially suitable for the new packet switching networks, such as the Internet or ATM networks.

A conceptual autosophy television system, shown in FIG. 2 is based on the new autosophy information theory and provides an alternative to the classical Shannon methods shown in FIG. 1. The conceptual autosophy television was previously disclosed in U.S. Pat. No. Holtz 4,992,868 "True Information Television (TITV) and Vision System. The main difference between the old disclosure and the present invention is that the old system was based on "parallel" Omni Dimensional Networks while the present invention uses "serial" Omni Dimensional Networks. The autosophy information theory at present includes six different Omni Dimensional Network types or learning modes, all of which may lead to potential data and image compression applications. The known omni dimensional networks types are: serial (used in the V.42bis standard and the present invention), parallel (used for image compression in U.S. Pat. No. 4,992,868), associative (used in brain-like atuotosopher), interrelational (potential applications in languages), logical and primary. All these network types or learning modes have been disclosed in prior publications.

Figure 1:
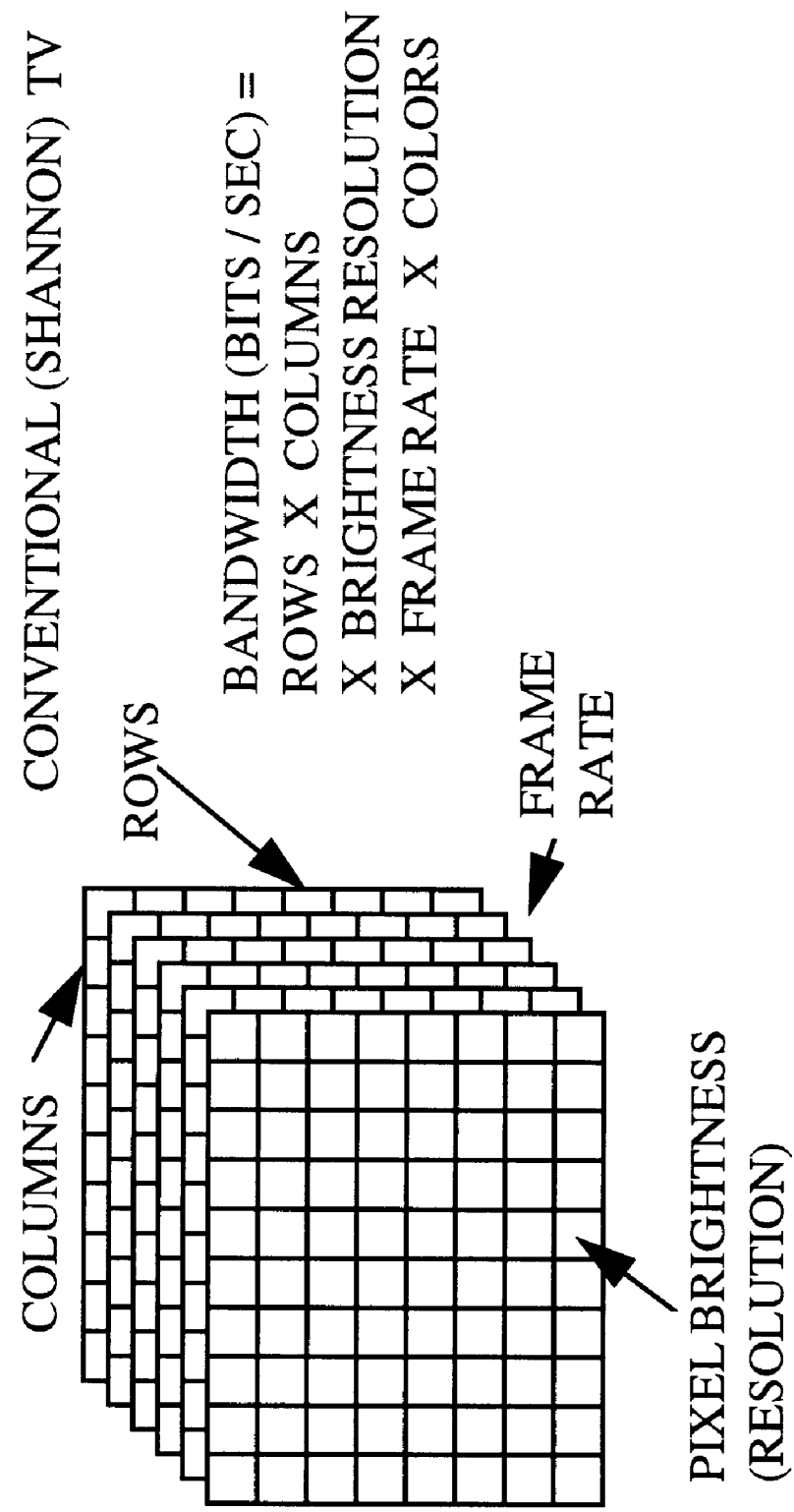
FIG. 1 illustrates the bandwidth required in the prior art conventional Shannon type television.

Reference Numerals and signal names in the Drawings

1 Next image buffer or video camera
2 Pixel brightness comparator
3 Current image buffer
4 Changed pixel fifo buffer
5 Input scan address counter
6 Spiral scanning encoder
7 Tree network encoder
8 Output code fifo buffer
9 I-IN Image input source
10 P-IN Pixel brightness value from the next image buffer or video camera
11 SCA Input scanning address from the input scan address counter
12 P-OUT Pixel brightness output value from the current image buffer
13 SPA Spiral scanning address from the spiral scanning encoder 14 NEQ Not equal signal from the pixel brightness comparator
15 PAD Screen address of changed pixel from changed pixel fifo buffer
16 NAD Hyperspace library output index code from tree network encoder
17 C-OUT Output superpixel code to transmitter
18 THR Optional threshold value from output code fifo buffer
19 Input code fifo buffer
20 Tree network decoder
21 Output image buffer
22 Spiral scanning decoder
23 Output scan address counter
24 C-IN Input superpixel code received from receiver
25 NADD Hyperspace library index code from input code fifo buffer
26 PADD Center pixel screen address code from input code fifo buffer
27 PBR Pixel brightness value from tree network decoder
28 SPAD Screen location address from spiral scanning decoder
29 SCAD Image output scan address from output scan address counter
30 I-OUT Image output data to the monitor

DETAILED DESCRIPTION OF FIG. 1

FIG. 1 shows the prior art conventional (Shannon) television transmission. The images are posed of pixels arranged in ordered rows and columns on the screen. Each pixel must be scanned and separately specified in the transmission. For digital television the bandwidth (bits per second) can be computed as the product of: rows, columns, brightness resolution (bits per pixel), the frame rate (frames per second) and the number of colors (Red-Green-Blue) in color television. These parameters are determined entirely by the hardware. The image actually to be shown on the screen is irrelevant and a totally random (snow) pattern would require just as many bits per second as a blank screen. Shannon's theories predict that any attempt to reduce the number of bits in the transmission must result in inevitable image distortions or loss of resolution (The Huffman code is an autosophy transmission!).

The only recourse is to hide these image distortions from the human observer. In JPEG, MPEG-2 cosine transform image compression, for example, the image is cut into 8 by 8 pixel tiles. The tiles are then transformed into cosine wave harmonics using cosine transform equations. The most dominant frequency harmonics are selected for transmission while lesser frequency harmonics are eliminated by quantization. The result is a "lossy" compression method in which the image distortions increase with the compression ratio until the image quality becomes unacceptable to the user.

DETAILED DESCRIPTION OF FIG. 2

Figure 2:
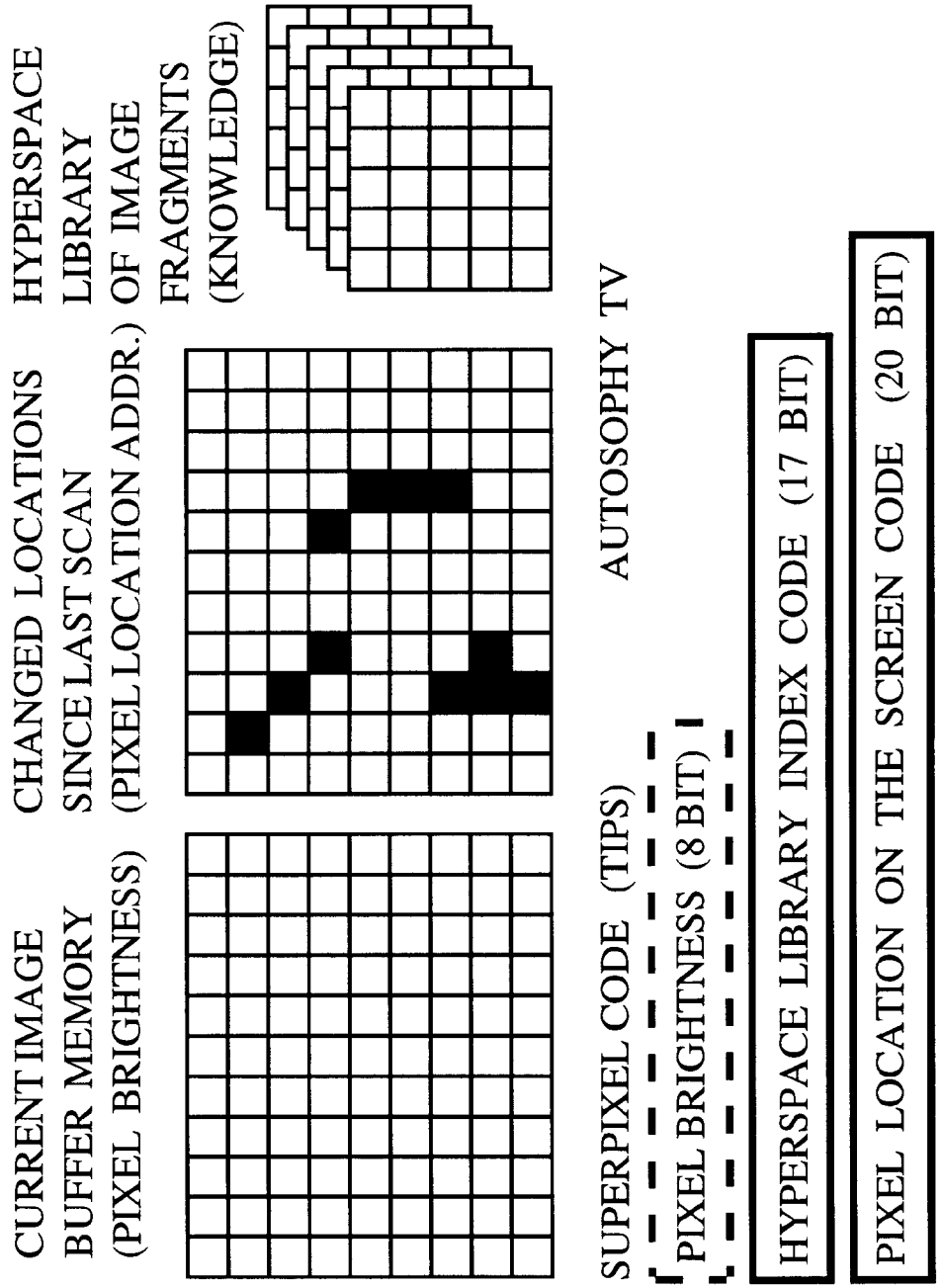
FIG. 2 illustrates the conceptual prior art autosophy television according to the autosophy information theory.

FIG. 2 shows a conceptual autosophy television method which was disclosed previously in U.S. Pat. No. Holtz 4,992,868. The difference between the present invention and the prior invention is found in the construction of the hyperspace library. The present invention employs a "serial" omni dimensional network hyperspace library while the prior art employs a "parallel" omni dimensional network hyperspace library.

An autosophy television system includes a "Current Image Buffer" and a "Hyperspace Library" both in the transmitter and in the receiver. The "Current Image Buffer" is a memory buffer which holds the current image information. The next image input from the TV camera is scanned in and compared pixel by pixel with the current image buffer. The screen address of any pixel which has changed, determined by a threshold value, is entered into a "Changed Locations Buffer". The new pixel brightness value from the camera, which has changed since the previous scan, is then entered into the "Current Image Buffer". Any input pixel value from the TV camera which is identical to the value in the "Current Image Buffer", within the threshold limits, is ignored. The result is that an updated version of the image is made available in the "Current Image Buffer" while the screen addresses of the changed pixels are available in the "Changed Locations Buffer". The changed portions of the image are then encoded using a "Hyperspace Library" of previously learned image fragments. The "Hyperspace Library" may contain either a "serial" omni dimensional network, as in the present invention, or a "parallel" omni dimensional network, as in U.S. Pat. No. 4,992,868. Using any of the remaining four omni dimensional network types, the associative, interrelational, logical or primary networks, is theoretically possible but not yet disclosed in any publication or patent. Encoding is done by comparing all the image fragments in the hyperspace library with the changed area in the current image to find the largest matching fragment in the library. The largest matching pattern is then identified with a "Hyperspace Library Index Code". All the changed pixel addresses in the "Changed Location Buffer" are compared in sequence with the hyperspace library to obtain "Hyperspace Library Index Codes". The process may be compared with a jigsaw puzzle in which the changed portions on the screen are matched with image fragments from the library. Since changes in television images are usually caused by large moving objects in the images, the changed pixel addresses usually form clusters including both the leading and the trailing edges of the objects. Many changed pixels in a cluster are usually combined in the same hyperspace pattern or "Hyperspace Library Index Code". Still images may be encoded by assuming that all pixels have changed and that all screen locations are contained in the "Changed Location Buffer". Imaging data transmissions would use a (17bit) "Hyperspace Library Index Code" to identify a matching pattern in the hyperspace library. The center pixel location where the change occurred is identified with a (20 bit) "Pixel Location on the Screen Code". An additional (8 bit) "Pixel Brightness Code" may be used to increase the library efficiency. Using this method allows the hyperspace library to contain only the brightness differences between the pixels so that the same "Hyperspace Library Index Code" may be shared by all dark or light images.

The receiver can reconstruct the images from the transmitted "Superpixel" codes. The "Hyperspace Library Index Code" is used to retrieve a data pattern from the hyperspace library in the receiver. The hyperspace libraries in both the transmitter and in the receiver must be identical. The data pattern from the hyperspace library is then loaded into an image output buffer in the receiver at a screen location determined by the (20 bit) "Pixel Location on the Screen Code". The output image is then scanned at regular intervals from the output image buffer to the TV monitor.

An autosophy television transmission uses "Superpixel" codes which are also called "Tips" (the tips of tree branches or the tips of data pyramids). Each "Superpixel" transmission may, dependent on the hyperspace library format, update any number of screen pixels in the receiver. Since only the moving or changing portions of the input images are extracted for transmission the transmission bandwidth is determined by "movement" within the images. Static images do not require any transmissions. The transmission bandwidth is also determined by the "novelty" in the images. Simple shapes or patterns in the input images will result in larger clusters found in the hyperspace library and therefore fewer transmissions. Novelty and movement in the images are image "content" dependent. Unlike in a Shannon type television the bandwidth is dependent only on the image "content" while hardware parameter, such as image size, resolution and scanning rates become irrelevant. Slow moving or static familiar images produce few "Superpixel" transmission codes while rapid movements or noise in the images would produce many more transmission codes.

DETAILED DESCRIPTION OF FIG. 3

An autosophy television system requires a pre-assembled hyperspace library both in the transmitter and in the receiver. These libraries may be grown from random input images using autosophy learning algorithms. Generic libraries may be distributed for open communications or for incorporation in all television transmitters and receivers. Without the correct library copy communications become virtually impossible. This feature may be exploited for image encryption in which libraries are made available only to authorized users.

Figure 3:
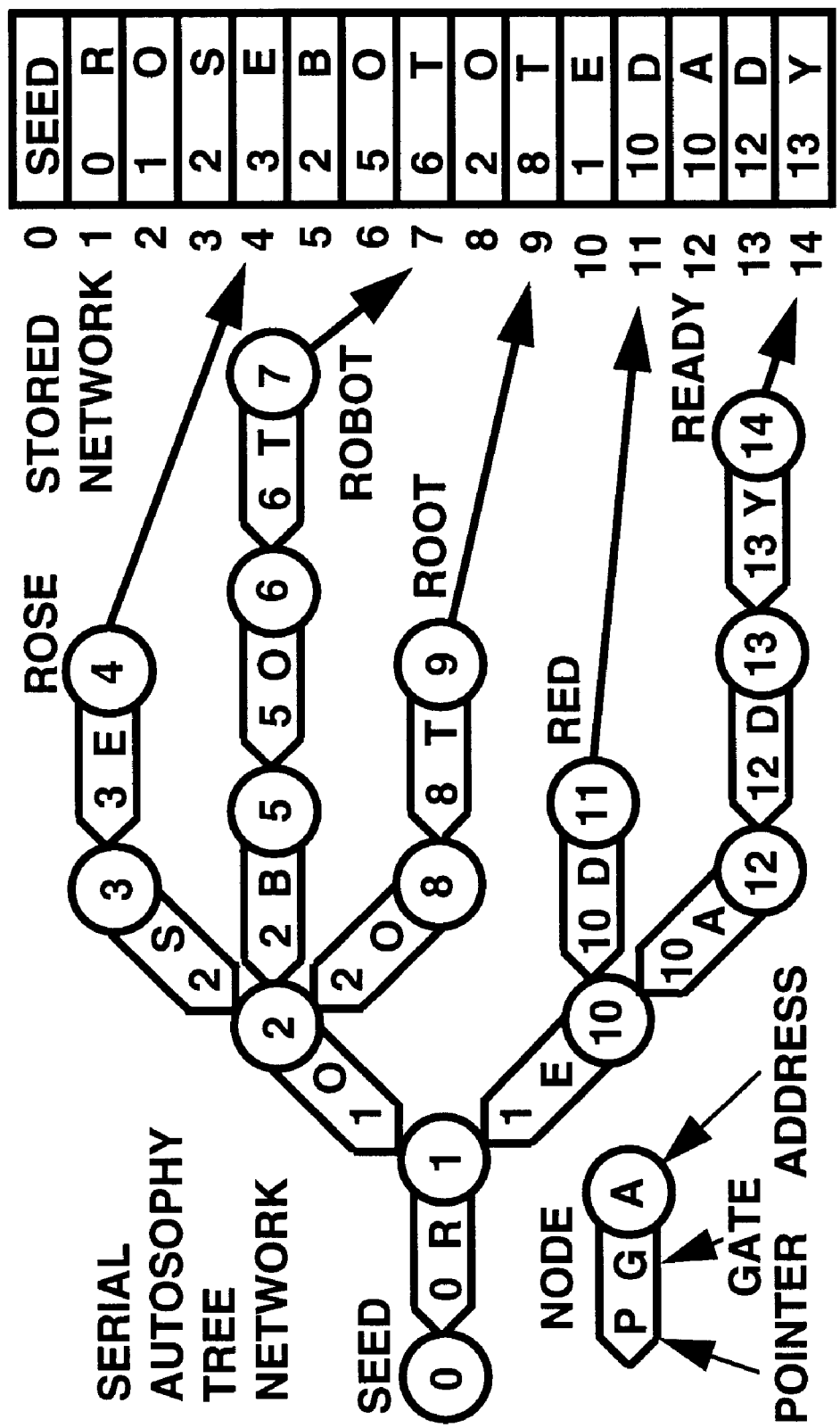
FIG. 3 illustrates the prior art "serial" self-learning autosophy network which is used in this invention.

A "serial" omni dimensional network, shown in FIG. 3, is used in this invention. The self-learning tree networks were first invented by Klaus Holtz in 1974 and are now covered by U.S. Pat. No. 4,366,551 claims 1 and 2. These networks are already used in the V.42bis compression standard for modems. A slight variation, known as the LZW (Lempel Ziv Welch) code terminates a tree branch at the first "not found" node. Image compression standards based on the LZW code are known as GIFF or TIF. Later theoretical work by Jacob Ziv and Abraham Lempel are known as the LZ-78 code (Reference "Compression of Individual Sequences via Variable-Rate Coding" IEEE Information Theory, IT-24, September 1978). Based on the LZ-78 code later inventions include: Eastman U.S. Pat. No. 4,464,650, Gilbert U.S. Pat. No. 4,386,416, Miller U.S. Pat. No. 4,814,746 and Welch U.S. Pat. No. 4,558,302.

A self-learning "serial" autosophy tree network in FIG. 3 will grow from text or image data in a computer memory like a data crystal or a data tree. The process is fully automatic, guided by simple algorithms, and does not require programming or outside supervision. The result is true mathematical "learning" according to the new Autosophy information theory. The stored network contains true mathematical "knowledge" where each memory words represents an "engram" (a unit of knowledge).

A "serial" omni dimensional network consists of identical nodes, each containing a "Gate" (a text character or pixel brightness value) and a backward "Pointer" which points to the originating "Address". The "Address" is the memory location where a node is stored. The network starts growing from a pre-selected "Seed" node. The combination "Gate—Pointer" is called a "Matrix". A first matrix is formed from the seed pointer and the first input character. The memory is searched to find such matrix already stored. If the matrix is found, then the memory address where it was found is used as the next pointer in the matrix. If the matrix is not found, then it is stored into a next empty memory location and the address into which it was stored is used as the next pointer in the matrix. The same steps are repeated for each character in the string. Eventually an "End of sequence" (an ASCII space for text or a maximum string length for image strings) will terminate the string. The last node address (the "Tip" of the tree branch) then defines the entire data string. The data strings can later be retrieved from the address (tip) code by following the pointer trail back to the seed node. The data strings are retrieved in reverse order and require a "First-In-Last-Out" (FILO) stack in the receiver.

The following routines are used in the generic "serial" omni dimensional networks which were previously disclosed in U.S. Pat. No. 4,366,551 claim 1 and 2.

GENERIC SERIAL TREE ALGORITHM

Matrix: [Gate]Pointer]

Start: Set POINTER=SEED=0
Loop: Move next input character into GATE
   If GATE is an "End of Sequence" then output
     POINTER code. Goto Start
   Else search memory for matching MATRIX
   If a matching MATRIX is found then move ADDRESS
     to POINTER. Goto Loop
   Else store MATRIX into next empty ADDRESS.
Move ADDRESS to POINTER. Goto Loop

GENERIC DATA RETRIEVAL

Matrix: [Gate]Pointer]

Start: Move input code to POINTER
Loop: Use POINTER as memory ADDRESS to fetch a
   new MATRIX from memory
   Store new GATE into a FILO stack
   If new POINTER=SEED=0 then retrieve output data
     from FILO stack. Goto Start
   Else Goto Loop The Lempel Ziv Welch (LZW) is a variation of the serial omni dimensional networks. The algorithms below are intended to show the differences between the two methods. The LZW is not used in the present invention. The LZW code was discovered ten years later by Terry Welch (Reference "A Technique for high-performance Data Compression" IEEE Computer, June 1984, and U.S. Pat. No. 4,558,302). This variation of the prior Holtz network grows a tree network during transmission in which the encoding sequence is terminated by the "first not found node". Because data strings are chopped into random string fragments, instead of whole text words as in the Holtz code, the library is known as a "string chop suey" in a "greedy" algorithm. This disorganized library, which is used in the GIFF and TIF graphics compression standard, leads in turn to disappointing compression ratios. The term "greedy" is used because the library will gobble up any string fragment including non-text characters. The library will continue growing during a transmission resulting in longer and longer searches. In the LZW code shown below the first 256 library locations are reserved as pointers for the first input characters. This in effect creates 256 sub-trees, one for each ASCII code character.

LZW ENCODING ROUTINE

Matrix: [Gate]Pointer]

Start: Use first 256 locations for first character
Loop: Clear POINTER in the MATRIX Loop1: Move next input character to GATE
    If POINTER=Clear then move GATE to POINTER.
        Goto Loop1
    Else search memory for matching MATRIX If matching MATRIX is found then move memory ADDRESS to POINTER. Goto Loop1
    Else store MATRIX into next empty ADDRESS Use MATRIX as output code. Goto Loop

LZW RETRIEVAL ROUTINE

Matrix: [Gate ]Pointer]

Start: Use first 256 locations as SEED nodes
Loop: Move input code into MATRIX
    Store MATRIX into next empty ADDRESS
    Store GATE into a FILO stack
Loop1: Use POINTER as memory ADDRESS to fetch new MATRIX from memory
    Store new GATE into the FILO stack
    If POINTER is less than 256 (SEED) then:
        Store POINTER into the FILO stack
        Retrieve output data from FILO stack
        Goto Loop
    Else Goto Loop1

DETAILED DESCRIPTION OF FIG. 4

Figure 4:
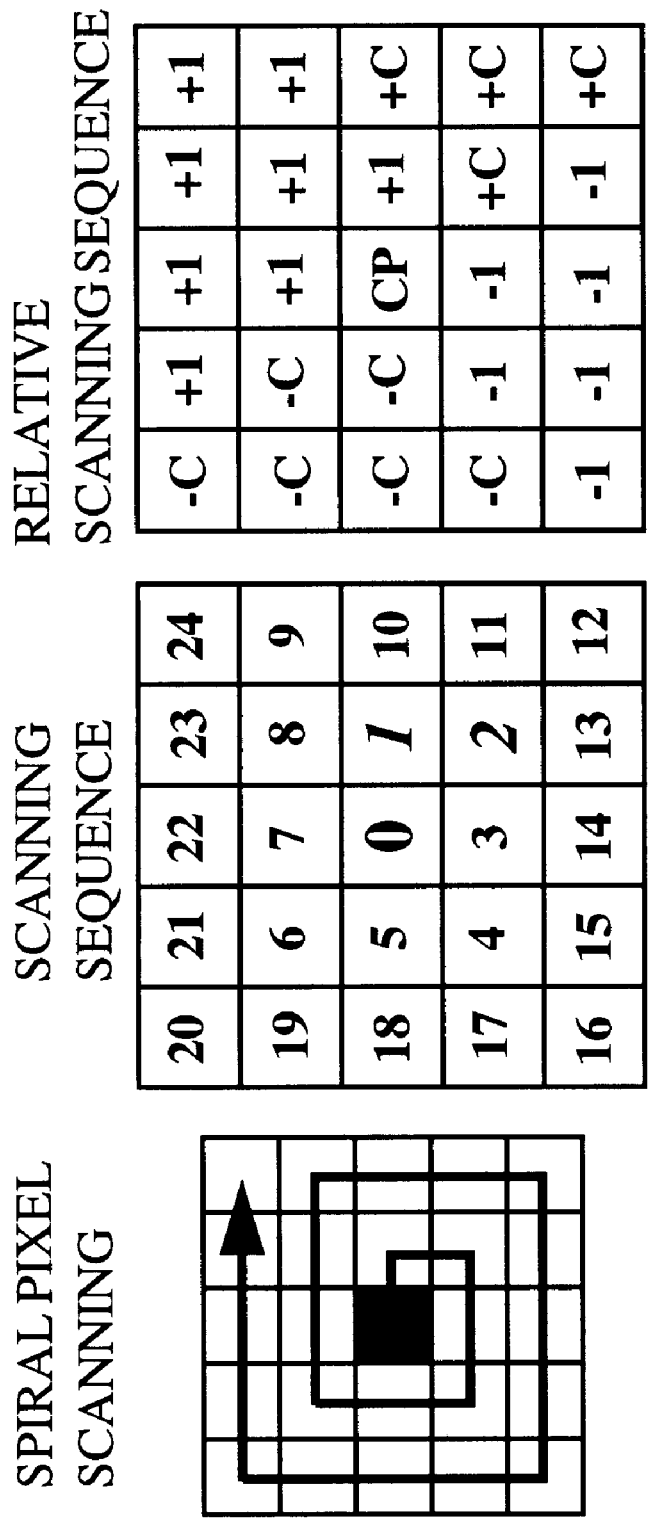
FIG. 4 illustrates a preferred pixel scanning mode in which screen pixels are scanned in a spiral pattern.

FIG. 4 shows the preferred scanning sequence of screen pixels to form superpixel strings. The scanning starts from a center pixel, which is a pixel that has changed since the last input image scan. The center pixel is identified in the superpixel transmission code both by an absolute "pixel brightness" (see FIG. 2) and a "pixel location on the screen code". The absolute "pixel brightness" is the new or changed brightness of a pixel that has changed since the last image input scan. The "pixel location on the screen" code identifies the location on the screen where the changed pixel is located.

Starting from the "pixel location on the screen code" a spiral scan is performed around the changed center pixel. This spiral scan will identify other changed pixels contained in the same cluster or superpixel. If other changed pixel codes in the spiral cluster are found in the "changed location buffer" then such codes are deleted from the "changed location buffer". The result is a finite length string of "pixel locations on the screen codes" which are then used to fetch a string of corresponding pixel brightness values from the "current image buffer". The string of pixel brightness values are then encoded by the serial tree network in the hyperspace library. Each pixel brightness value is encoded like a text character in the tree network except that the string is terminated by a fixed string length limit rather than an ASCII "space" as in text words. The tree network will output a "hyperspace library index code" which it the tip of the tree branch. All three values: the "pixel brightness", the "hyperspace library index code" and the "pixel location on the screen code" are combined into a superpixel code for transmission. The receiver will use the three values to retrieve a pixel string from its own identical hyperspace library and paste then into the output image buffer for display on the monitor.

A spiral scan as shown in FIG. 4 is preferred because it is most likely to identify other changed pixels around the changed center pixel. Rotating the scanning sequence by an angle will yield equivalent results. Pixels are scanned around the center pixel until either a fixed string length is reached or the scan hits a screen limit. If the scanning sequence hits a position which is outside the physical screen area, either above or below or right left then the string is terminated to include the last pixel which is still within the physical screen area.

The "scanning sequence" figure shows the sequence of the pixels in the scanning operation. String position 0 is the center pixel or the first value in the string. String position 1 and 2 are the next pixels in the sequence which are usually encoded by a special "phantom library" (see FIG. 5). The remaining positions complete the string in a spiral around the center pixel.

A "relative scanning sequence" is used in the third figure to avoid any absolute screen format dependency. In an autosophy television system each television camera or television monitor may have its own screen format or scanning rates and yet communicate in a common format. A television camera may have a unique number of rows and columns which may be entirely different from the receivers monitor rows and columns. The number of rows and columns is a constant which is known in each system. A transmitter may encode an image using its own number of rows and columns in the television camera and transmit the superpixel codes to an unknown receiver which may have an entirely different number of rows and columns on its monitor. Communications in a universal hardware independent code is the main feature of this invention.

The screen address of the next pixel in the spiral scan string is computed in a regular fashion by either incrementing/decrementing the previous screen address or by adding/subtracting fixed column constants from the previous pixel address. To identify a next pixel on the right the present screen address is incremented by 1. To identify a next pixel on the left a 1 is subtracted from the present screen address. A next pixel below is computed by adding a fixed "# of columns" constant to the present screen address. A next pixel address above is computed by subtracting a fixed "# of columns" constant from the present screen address. Usually a screen address contains a separate portion for columns (the lower significant address bits) and a portion for rows (the higher significant address bits). Any overflow in the next pixel computation from one portion to the other usually identifies a pixel address which is outside the physical screen area. Hitting the physical screen limits usually terminates the scanning sequence or the spiral string length. The string length is usually limited by a pre-selected string length constant.

STRING SCANNING SEQUENCE COMPUTATION

Pixel #

0 Center Pixel Address (changed pixel location on the screen code)

1 add 1 to Center Pixel Address (Pixel 1 is encoded in the phantom library)

2 add # of column constant to Pixel 1 Address (encoded in phantom library)

3 subtract 1 from Pixel 2 Address

4 subtract 1 from Pixel 3 Address

5 subtract # of column constant from Pixel 4 Address

6 subtract # of column constant from Pixel 5 Address

7 add 1 to Pixel 6 Address

23 add 1 to Pixel 22 Address

24 add 1 to Pixel 23 Address. End of sequence in this example

DETAILED DESCRIPTION OF FIG. 5

Figure 5:
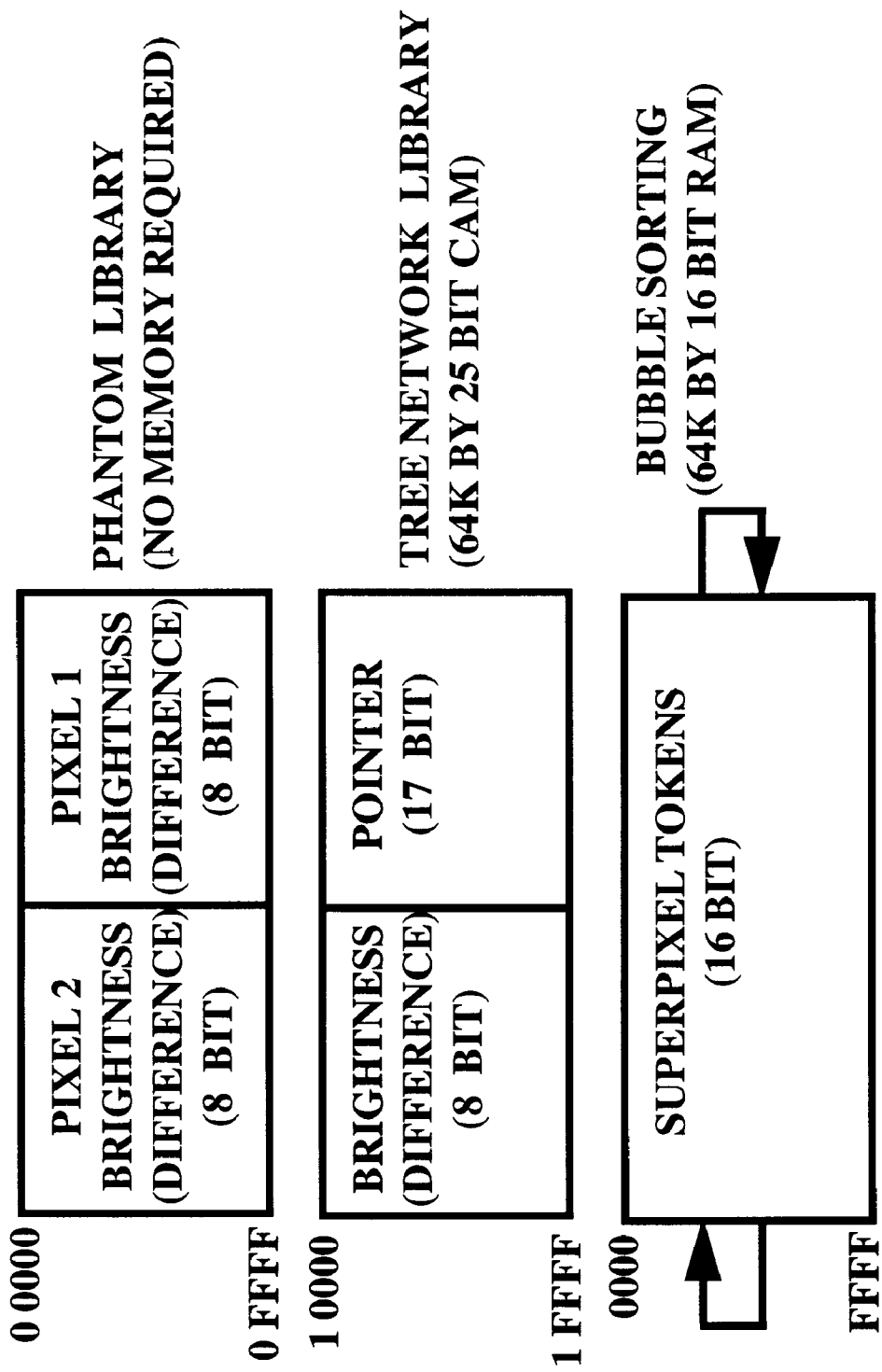
FIG. 5 shows a preferred hyperspace library format and a bubble sorting list used in the preparation of the hyperspace library.

FIG. 5 shows the preferred format of the hyperspace library. The library is grown automatically from random image inputs (from a TV camera or from a CDROM image library) using the tree algorithms and the spiral scanning algorithms which are explained later. There is usually only one hyperspace library for encoding all colors (red, green, blue) in sequence where each color requires a separate but identical encoding operation.

A "Phantom Library" is used to encode the second (Pixel 1) and third (Pixel 2) pixel after the center pixel (Pixel 0). In an open system (one without encryption) the phantom library may contain its own address (from HEX 0 0000 to 0 FFFF) so that no actual hardware memory is required in the system. A location in the phantom library is identified later by a pointer with the most significant address bit=0. This last pointer (with the MSB=0) then simply represents the brightness of the last two pixels (before the center pixel brightness). In a theoretical sense the phantom library provides the "seed" address for the tree network. This library contains all the possible (16 bit) combinations of brightness values formed by two (8 bit) pixel brightness codes. The (8 bit) pixel brightness codes may either be absolute brightness values or brightness differences. This provide three possible network implementations:

1 If the hyperspace library contains absolute pixel brightness values the no "pixel brightness" (see FIG. 2) in the superpixel output code is required. The hyperspace patterns would not be shared between light and dark images leading to a less efficient library but a shorter superpixel code.

2 If the hyperspace library contains the difference in brightness between the absolute center pixel brightness and the string pixel brightness values then the hyperspace library pattern would be shared and used for encoding all light or dark images. This shared library would be much more efficient, containing many more image pattern, but also would require a "pixel brightness" value in the superpixel code as shown in FIG. 2.

3 The hyperspace library may also be grown to contain the brightness difference between a pixel and its preceding pixel. The hyperspace library then contains strings of differences in brightness starting from the absolute brightness value of the center pixel. This library would be very efficient and share its brightness pattern for any light and dark images.

The tree network library is the actual hyperspace library used for image compression. The library is grown from image inputs using the algorithms shown later. Each node or memory location would contain an (8 bit) brightness value (Gate) and a (17 bit) pointer. The brightness value may be either absolute or brightness differences which must be identical to the phantom library. A (17 bit) pointer with the most significant bit equal to 1 would point at another tree node while a pointer with the most significant bit equal to zero would point to the phantom library. For real time television encoding a Content Addressable Memory (CAM) would be required. The library must be identical in the transmitter and in the receiver. This provides for three possible library implementations:

1 A fixed hyperspace library may be grown in a laboratory and used as a generic fixed library. The library pattern may be stored as part of an image compression software package. The library pattern may also be stored in a hardware Read Only Memory (ROM) for use in High Definition Television (HDTV) broadcast. This generic library would allow for open image communications, for example in: teleconferencing; or for compressed image transmissions on the Internet.

2 A secret hyperspace library may be grown by a user and provided only to authorized parties. The library may be grown by a software package using random input images from a TV camera or from commercial images from a CDROM. The library may be exchanged using floppy disc, PCMCIA modules, or file down-loading from the Internet. This implementation provides a virtually unbreakable encryption code for secure communications. Only receivers in possession of the correct hyperspace library will be able to retrieve the images from a transmission or recording. Encrypted image transmissions or storage will however use the same communication format and protocol.

3 A teleconferencing system may start from an empty hyperspace library where the image patterns are learned simultaneously, in both the transmitter and in the receiver, from the transmitted images. Such a system will adapt to the specific images in a transmission to promise higher compression ratios. The system can be made to dynamically eliminate seldomly used patterns and retain only the most often used patterns. The digital transmission must not contain any errors. A single bit error in the transmission would make the libraries in the transmitter and in the receiver to become different. This would hopelessly scramble all further image transmissions.

A "bubble sorting" memory is used for growing the hyperspace library. The input are (16 bit, bit 17 is always 1) superpixel tokens from the tree network encoder. Each input code identifies a specific (24 pixel) spiral pattern from the tree network encoding algorithm. For each input code the bubble sorting list is searched to find an identical code already stored in the bubble list. If the input code is not found in the list then it is added to the end of the list. If an identical code is already stored in the list then it is swapped with the code one position higher in the list, unless the code is already at the top of the list. In this way the most common image fragment pattern would tend to migrate, or bubble up, towards the top of the list while less common image pattern would be pushed down towards the bottom of the list. The bubble sorting list is used to identify the most common image fragments in normal input images. Retrieving the image patterns later, starting from the top of the list, identifies the most common patterns in normal images in order to grow the most efficient hyperspace library. The bubble sorting list is only used for generating a hyperspace library. It is not required during normal television encoding or retrieval.

DETAILED DESCRIPTION OF FIG. 6

Figure 6:
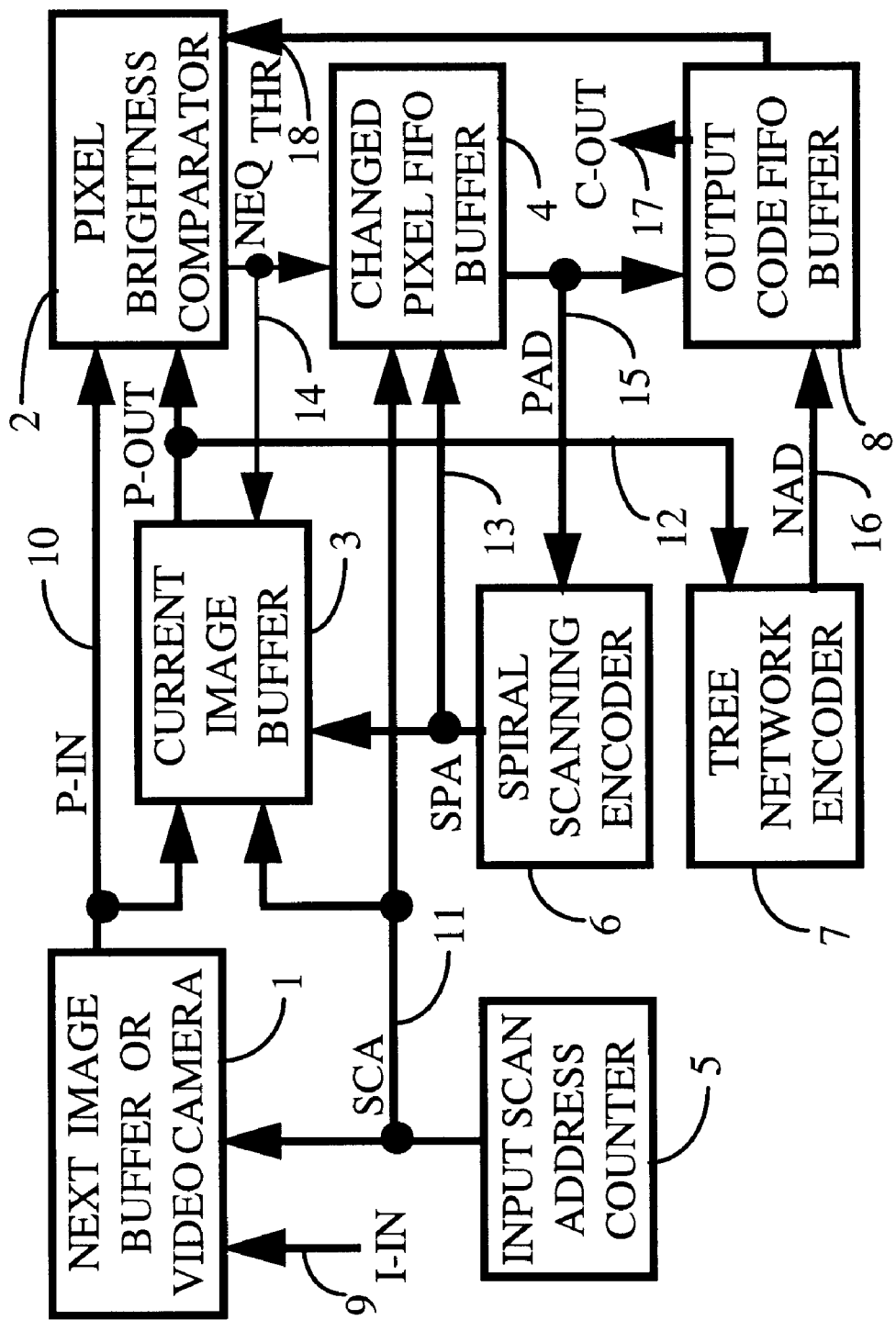
FIG. 6 shows the television encoding system components which may be implemented in hardware or software.

FIG. 6 shows the function blocks and the interconnections of a serial network autosophy television encoding system. All the function blocks can be implemented in electronic hardware, as software routines or in any combination of hardware and software. The input to the system consists of images I-IN 9 which are either presented to a television camera or which are taken from already scanned graphics images stores. The output from the system consists of superpixel codes (see FIG. 2) C-OUT 17 which are either transmitted to a receiver or which are stored in digital memory devices.

A NEXT IMAGE BUFFER OR VIDEO CAMERA 1 provides the next input image for encoding. The function may be implemented as a digital television camera, such as Charge Coupled Devices (CCD) cameras, which are commercially available. The input I-IN 9 in that case would consist of images presented to the television camera. The function may also be implemented as a memory buffer which holds each image for encoding. Graphics input images I-IN 9 in this case would be supplied from image storage devices, such as a CDROM. Once an image is stored in this function it is scanned out using an Input Scanning Address SCA 11 generated by the INPUT SCAN ADDRESS COUNTER function 5. The output P-IN 10 is a serial string of pixel brightness values which represents the image.

A CURRENT IMAGE BUFFER 3 is a digital memory device which hold the current or previously encoded image. Such image storage devices are known and commercially available. Each pixel brightness value in the image is stored in a memory location. For color television encoding a separate parallel buffer memory may be used for each color (red, green, blue) or each color may be encoded in series using the same buffer memory. The data input to the memory is the pixel brightness value P-IN 10 from the NEXT IMAGE BUFFER OR VIDEO CAMERA 1. The new pixel brightness value is stored in the memory only if a Not Equal signal NEQ 14 is received from the PIXEL BRIGHTNESS COMPARATOR function 2. The digital address to the memory is supplied by the Input Scanning Address SCA 11 generated by the INPUT SCAN ADDRESS COUNTER function 5. Each Input Scanning address will retrieve a Pixel Brightness Output value P-OUT 12 from the current image buffer. A secondary path or means to retrieve Pixel Brightness Output values P-OUT 12 from the current image buffer must be provided. This secondary address is a Spiral Scanning Address SPA 13 which is generated by the SPIRAL SCANNING ENCODER function 6.

A PIXEL BRIGHTNESS COMPARATOR 2 is used to determine whether or not the new input pixel brightness value P-IN 10 from the NEXT IMAGE BUFFER OR VIDEO CAMERA 1 is equal to the equivalent Pixel Brightness Output values P-OUT 12 from the CURRENT IMAGE BUFFER 3. Such digital comparator circuits are known and commercially available. The comparison may include an optional Threshold Value THR 18 from the OUTPUT CODE FIFO BUFFER 8. This threshold value may also be generated by the CHANGED PIXEL FIFO BUFFER 4. The threshold value is computed from the number of output superpixel codes C-OUT 17 stored in the OUTPUT CODE FIFO BUFFER 8. The more codes are stored, the higher the threshold value and the more pixel brightness resolution steps are required before a pixel comparison is found to be not equal. A Not Equal output signal NEQ 14 is generated if the two input pixel brightness values are outside the specified threshold limits.

An INPUT SCAN ADDRESS COUNTER function 5 is used to generate a digital Input Scanning Address SCA 11 sequence. This function may be implemented by known digital counter circuits. The scanning address is supplied to the NEXT IMAGE BUFFER OR VIDEO CAMERA function 1 to cause the output of a new pixel brightness value. The same scanning address is simultaneously applied to the CURRENT IMAGE BUFFER 3 to cause the output of the corresponding previous pixel brightness value from the previous image. If the two pixel brightness values are found to be Not Equal NEQ 14 by the PIXEL BRIGHTNESS COMPARATOR 2 then the Scanning Address SCA 11 is stored in the CHANGED PIXEL FIFO BUFFER 4.

A CHANGED PIXEL FIFO BUFFER function 4 is used to accumulate all the screen location addresses of all the pixels which have changed since the last image scan. Such buffer memories can be implemented in known hardware. Since an autosophy television only transmits the changed portions of the screen image the changed pixel fifo buffer is used to identify the screen locations of such changes. During the image input scan phase the Scanning Address SCA 11 from the INPUT SCAN ADDRESS COUNTER 5 is stored in the changed pixel fifo buffer only if a Not Equal NEQ 14 signal from the PIXEL BRIGHTNESS COMPARATOR 2 is received. The stored Screen Address Locations in the changed pixel fifo buffer are later retrieved as Pixel Addresses PAD 15 for superpixel encoding. During the spiral superpixel encoding sequence the SPIRAL SCANNING ENCODER 6 will generate similar Screen Address Locations or Spiral Addresses SPA 13 of neighboring pixels. If a matching Spiral Address SPA 13 is contained or found stored in the CHANGED PIXEL FIFO BUFFER 4 then such a matching Spiral Address must be removed or erased in the CHANGED PIXEL FIFO BUFFER 4. This function provides that all pixels in a spiral cluster are combined in a single superpixel code. Several changed pixels in the same spiral cluster must not generate separate output superpixel codes.

A SPIRAL SCANNING ENCODER function 6 generates a spiral scanning sequence similar to the preferred method previously explained in FIG. 4. The spiral scan will produce the addresses of screen pixels within a scanning area. The input code is the Center Pixel screen location address which is the Pixel Address PAD 15 from the CHANGED PIXEL FIFO BUFFER 4. The output is a series of Spiral Addresses SPA 13 which are applied to the CURRENT IMAGE BUFFER function 3 and the CHANGED PIXEL FIFO BUFFER 4. The Spiral Addresses SPA 13 will retrieve Pixel Brightness output values P-OUT 12 from the CURRENT IMAGE BUFFER 3 for encoding by the TREE NETWORK ENCODER 7. This function also requires an input of a constant defining the number of rows and columns in the transmitter system.

A TREE NETWORK ENCODER function 7 converts a serial string of pixel brightness values P-OUT 12 from the CURRENT IMAGE BUFFER 3 into a single hyperspace library index code NAD 16. The generic tree algorithm was previously explained in FIG. 3. A more detailed algorithm will be provided later. For real time encoding the hyperspace library should be implemented as a Content Addressable Memory (CAM) to contain the hyperspace tree library shown previously in FIG. 5.

An OUTPUT CODE FIFO BUFFER function 8 is provided to hold the output superpixel codes C-OUT 17 for transmission or storage. The superpixel output code was previously shown in FIG. 2. Each superpixel code consist of three digital values:

The optional absolute PIXEL BRIGHTNESS value which is the first input pixel value NAD 16 from the TREE NETWORK ENCODER 7. This value is not used if the hyperspace library contains absolute brightness values.

The HYPERSPACE LIBRARY INDEX CODE which is the second value NAD 16 received from the TREE NETWORK ENCODER 7. This code provides a string of pixel brightness values represented by a single hyperspace node address.

The PIXEL LOCATION ON THE SCREEN CODE is the screen location address of the Center Pixel. This digital address is the Pixel Address PAD 15 from the CHANGED PIXEL FIFO BUFFER 4.

DETAILED DESCRIPTION OF FIG. 7

Figure 7:
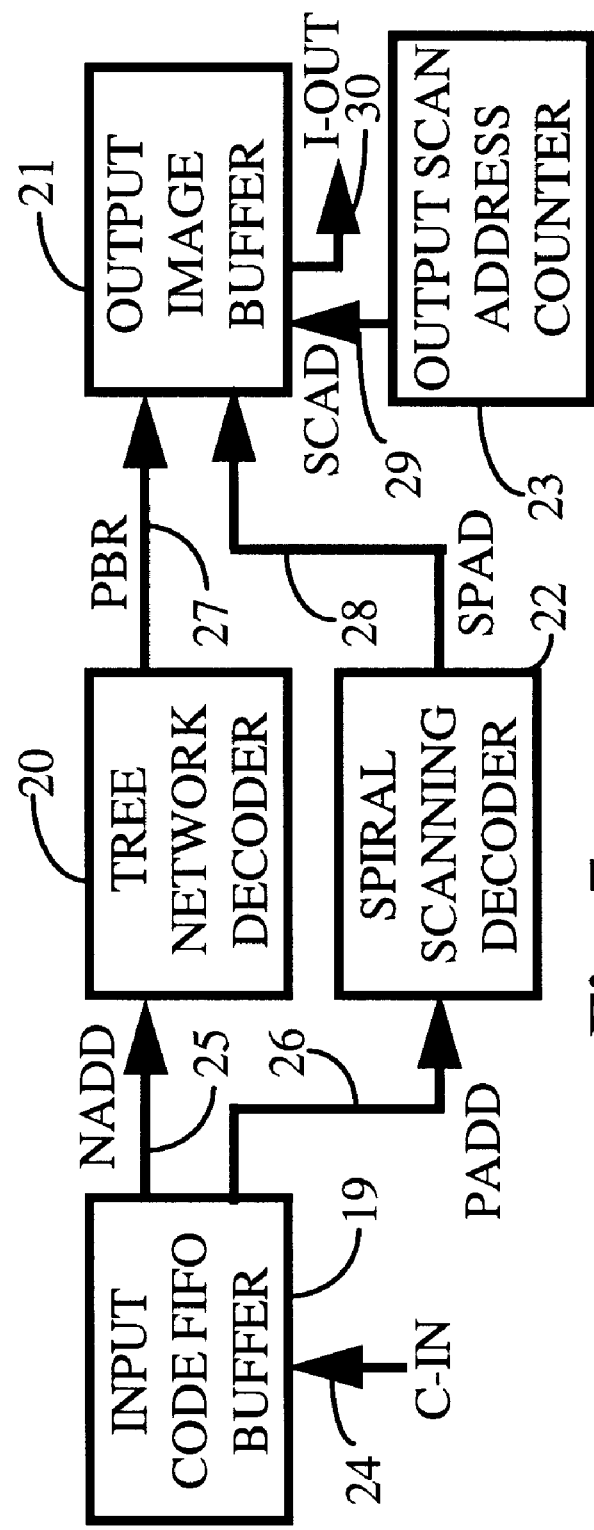
FIG. 7 shows the television retrieval systems components which may be implemented in hardware or software.

FIG. 7 shows the image retrieval system. The system will retrieve output images I-OUT 30 from input superpixel codes C-IN 24. All the function blocks may be implemented by electronic hardware, by software routines, or by any combination of hardware and software.

An INPUT CODE FIFO BUFFER function 19 is used to hold the superpixel input codes C-IN 24 until they can be converted into images by the system. The buffer can be implemented as a digital memory device in hardware or as a memory section in software. The input C-IN 24 consist of digital superpixel codes each of which may contain the following sections:

An optional absolute PIXEL BRIGHTNESS value which is the absolute brightness of the center pixel (see FIG. 2 and 4). This value is later send as the first output code NADD 25 to the TREE NETWORK DECODER 20. This value is not used if the hyperspace library contains absolute brightness values.

A HYPERSPACE LIBRARY INDEX CODE which is the second value NADD 25 later send to the TREE NETWORK DECODER 20. This code provides a string of pixel brightness values represented by a single hyperspace node address.

A PIXEL LOCATION ON THE SCREEN CODE is the screen location address of the Center Pixel. This digital address is later send as PADD 26 to the SPIRAL SCANNING DECODER 22. This code is later converted into a string of screen location address codes which form a spiral cluster.

A TREE NETWORK DECODER function 20 contains a hyperspace tree library which must be identical to the hyperspace tree library in the transmitter. This function may be implemented as a Read-Only Memory (ROM) in hardware or as a memory section in software. The input NADD 25 consist of two values from the INPUT CODE FIFO BUFFER 19 which are an optional PIXEL BRIGHTNESS value and a HYPERSPACE LIBRARY INDEX CODE. The input codes are converted into an output string of pixel brightness values PBR 27 which are retrieved from the hyperspace tree library.

A SPIRAL SCANNING DECODER function 22 converts the input PIXEL LOCATION ON THE SCREEN CODE, which is the screen location address of the Center Pixel, PADD 26 into an output string of screen location address codes SPAD 28 which form a spiral cluster. The screen location address codes are generated by the algorithm shown in FIG. 4. This function can be implemented by a Read-Only Memory (ROM) look-up table and a binary adder circuit in hardware or as an algorithm in software. This function also requires an input of fixed constants which defines the number of rows and columns used in the receiver system. These rows and columns constants may be entirely different to the rows and columns constants in the transmitter.

A OUTPUT IMAGE BUFFER function 21 holds the entire output image in a Random Addressable Memory (RAM). Changes in the image are deposited, pixel by pixel, into the memory using: the pixel brightness values PBR 27 from the TREE NETWORK DECODER 20 as the memory input "data" and the screen location address SPAD 28 from the SPIRAL SCANNING DECODER 22 as the memory "address". The function requires a secondary access means to scan the output image data I-OUT 30 to a television monitor. This secondary scanning address SCAD 29 is supplied by the OUTPUT SCAN ADDRESS COUNTER function 23.

An OUTPUT SCAN ADDRESS COUNTER function 23 is used to scan the image in the OUTPUT IMAGE BUFFER function 21 to an output television monitor via I-OUT 30. The function may be implemented as a common binary counter circuit. The function must contain a scanning clock which determines the image refresh scanning rate of the television monitor. Since the entire image is always available in the OUTPUT IMAGE BUFFER function 21 and changes to the images are deposited when they arrive in superpixel code transmissions, the scanning rate of the transmitter and the receiver need not be identical. Every transmitter may have its own input image frame rate while each receiver may have an entirely different refresh frame rate to the monitor. This allows for the free and independent evolution of television cameras and monitors while maintaining a backward compatible transmission format.

PREPARING A HYPERSPACE TREE LIBRARY
IN FIG. 6

The operations of an autosophy television system requires a hyperspace pattern library of image fragments. In this invention the hyperspace library contains a "serial" omni dimensional network. The network is grown from random input images, from a television camera or from a CDROM, and the network preparation algorithms. The process may use hardware functions, software only or any combination of hardware and software. Normally a network is grown in non real-time by software routines. Once the libraries have been grown they are inserted into both the transmitter TREE NETWORK ENCODER function 7 and in the receiver TREE NETWORK DECODER function 20. A generic hyperspace library may be developed in a laboratory and then copied for distribution. This allows for open communications, such as on the Internet or for broadcast of High Definition Television. A secret hyperspace library may be developed and made available to authorized users only. This provides a near unbreakable encryption for secure communications.

A hyperspace tree network is prepared in two phases. In the first phase input images, from a TV camera or from a CDROM, are applied to the algorithm. The changed image portions are then converted to fixed length (24) pixel strings by spiral scanning. Each string is then encoded by the serial hyperspace tree network and converted into a (16 bit) address token. The address tokens are send to a bubble sorting list in which each unique token is only stored once. The most often encountered tokens will tend to migrate, or bubble-up, towards the top of the list. In the second phase the tokens are taken from the bubble list, starting from the top of the list, and converted back into (24) pixel strings. The pixel strings are then used to grow a second tree network, which is the final output hyperspace tree network library.

HYPERSPACE TREE LIBRARY GENERATION
ROUTINE

NETWORK 1 MEMORY: [(64k by 25 bit) NRAM1]
NETWORK 2 MEMORY: [(64k by 25 bit) NRAM2]
MATRIX REGISTER: [GATE (8 bit)]POINTER (17 bit)]
BACKGROUND BRIGHTNESS: [BACKG (8 bit)]
STRING LENGTH COUNTER: [LENGTH]
CHANGED PIXEL FIFO 4: [ (20 bit) FIFO]
PIXEL ADDRESS PAD 15: [PAD (20 bit)]
CURRENT IMAGE BUFFER 3: [(8 bit) RAM]
BUBBLE LIST: [(16 bit) RAM]
BUBBLE LIST ADDRESS: [(16 bit) BA]
FILO STACK: [(8 bit by 24 word) FILO]
Start: Deposit a new image into the NEXT IMAGE BUFFER OR VIDEO CAMERA 1

Put changes from previous image into CHANGED PIXEL FIFO BUFFER 4 using:
CURRENT IMAGE BUFFER 3
INPUT SCAN ADDRESS COUNTER 5
PIXEL BRIGHTNESS COMPARATOR 2
Put Not Equal NEQ 14 pixel locations into CHANGED PIXEL FIFO 4
Put Not Equal pixel brightness into CURRENT IMAGE BUFFER 3
Pull: If CHANGED PIXEL FIFO BUFFER 4 is empty then Goto Start
Pull a pixel location address from the CHANGED PIXEL FIFO 4
Put pixel location address into PAD
Use PAD address to fetch BACKG from CURRENT IMAGE BUFFER 3
Pixel2: Compute next spiral pixel location using SPIRAL SCANNING ENCODER 6
Use next spiral pixel location to fetch brightness from CURRENT IMAGE BUFFER 3
Subtract BACKG from brightness value
Put result into lower 8 bit of POINTER in the MATRIX
Compute next spiral pixel location using SPIRAL SCANNING ENCODER 6
Use next spiral pixel location to fetch brightness from CURRENT IMAGE BUFFER 3
Subtract BACKG from brightness value
Put result into upper 8 bit of POINTER in the MATRIX
Set POINTER most significant bit to zero
Set string length counter LENGTH=2
Loop: Increment string length count LENGTH=LENGTH+1
If "End of string" LENGTH=25 then: Send POINTER to BUBBLE LIST. Goto Pull
Else compute next spiral pixel location using SPIRAL SCANNING ENCODER 6
Search CHANGED PIXEL FIFO BUFFER 4 to find next spiral pixel location
If next spiral pixel location is found then erase it in the CHANGED PIXEL FIFO 4
Use next spiral pixel location to fetch brightness from CURRENT IMAGE BUFFER 3
Subtract BACKG from brightness value
Put result into GATE in the MATRIX
Search first tree network NRAM1 for a matching MATRIX
If a matching MATRIX is found then move memory ADDRESS where it was found to POINTER in MATRIX. Goto Loop
Else store MATRIX into next empty memory ADDRESS NRAM1, starting with MSB=1
Move memory ADDRESS where it was stored to POINTER in the MATRIX If library NRAM1 is full then Goto Phase2
Else Goto Loop
Phase2: Set BUBBLE LIST ADDRESS to top of list, BA=0000 Hex
Loop1: If at the bottom of the BUBBLE LIST (FFFF Hex) then Goto EXIT Else fetch a token from BUBBLE LIST using BUBBLE LIST ADDRESS BA Move token into POINTER in MATRIX
Loop2: Use POINTER as a memory ADDRESS to fetch a new MATRIX from NRAM1
Push new GATE into FILO STACK FILO
If new POINTER bit 17=1 then Goto Loop2
Loop3: If the FILO STACK FILO is empty then increment BUBBLE LIST ADDRESS BA=BA+1, Goto Loop1
Else pull data from the FILO STACK and move it to the GATE in the MATRIX
Search second tree network NRAM2 for a matching MATRIX
If a matching MATRIX is found then move memory ADDRESS where it was found to POINTER in MATRIX. Goto Loop3
Else store MATRIX into next empty memory ADDRESS NRAM2, starting with MSB=1
Move memory ADDRESS where it was stored to POINTER in the MATRIX
If library NRAM2 is full then Goto EXIT
Else Goto Loop3

TRANSMITTER OPERATIONS IN FIG. 6

The operations of the transmitter may be divided into two phases. In Phase 1 a new input image is scanned from the television camera and compared with the previous or current image to determine the changes in the image and to update the changed screen areas in the current image buffer. In Phase 2 the changes are encoded into superpixel output codes using spiral scanning of screen pixel locations and a hyperspace tree library.

IMAGE INPUT TO SUPERPIXEL OUTPUT ENCODING ROUTINE

NETWORK MEMORY 7: [(64k by 25 bit) NRAM]
MATRIX REGISTER: [GATE (8 bit)]POINTER (17 bit)]
BACKGROUND BRIGHTNESS: [BACKG (8 bit)]
CHANGED PIXEL FIFO 4: [(20 bit) FIFO]
PIXEL ADDRESS PAD 15: [PAD (20 bit)]
CURRENT IMAGE BUFFER 3: [(8 bit) IBRAM]
PIXEL BRIGHTNESS OUTPUT CODE: [(8 bit) PB]
HYPERSPACE LIBRARY INDEX CODE: [(17 bit) NAD]
PIXEL LOCATION ON THE SCREEN CODE: [(20 bit) PAD]
SUPERPIXEL OUTPUT CODE: SP=PB–NAD–PAD
Start: Load a new or next image into the NEXT IMAGE BUFFER OR VIDEO CAMERA 1
Put changes from previous image into CHANGED PIXEL FIFO BUFFER 4 using:
CURRENT IMAGE BUFFER 3
INPUT SCAN ADDRESS COUNTER 5
PIXEL BRIGHTNESS COMPARATOR 2
Put Not Equal NEQ 14 pixel locations into CHANGED PIXEL FIFO 4
Put Not Equal pixel brightness into CURRENT IMAGE BUFFER 3
Loop: If CHANGED PIXEL FIFO 4 is empty then Goto Start
Else pull a next Center Pixel Location from CHANGED PIXEL FIFO 4
Move Location code to PIXEL LOCATION ON THE SCREEN CODE PAD
Use Location code to fetch Center Pixel Brightness from CURRENT IMAGE BUFFER 3
Put Center Pixel Brightness into PIXEL BRIGHTNESS output code PB
Put Center Pixel Brightness into BACKGROUND BRIGHTNESS BACKG
Compute Next Pixel Location using SPIRAL SCANNING SEQUENCE COMPUTATION
If Next Pixel Location is outside screen area then "End of String". Goto Trans If Next Pixel Location is in CHANGED PIXEL FIFO BUFFER 4 then erase Next Pixel Location from CHANGED PIXEL FIFO BUFFER 4
Use Next Pixel Location address to fetch Next Pixel from CURRENT IMAGE BUFFER 3
Subtract BACKG from Next Pixel brightness
Put result into low (8 bit) POINTER in the MATRIX
Compute Next Pixel Location address
If Next Pixel Location is outside screen area then "End of String". Goto Trans
If Next Pixel Location is in CHANGED PIXEL FIFO BUFFER 4 then erase Next Pixel Location from CHANGED PIXEL FIFO BUFFER 4
Use Next Pixel Location address to fetch Next Pixel from CURRENT IMAGE BUFFER 3
Subtract BACKG from Next Pixel brightness
Put result into high (8 bit) POINTER in the MATRIX
Set POINTER in MATRIX Most Significant Bit to zero (MSB=0)
Loop1: Compute Next Pixel Location address
If Next Pixel Location is outside screen area then "End of String". Goto Trans
If Next Pixel Location is in CHANGED PIXEL FIFO BUFFER 4 then erase Next Pixel Location from CHANGED PIXEL FIFO BUFFER 4
Use Next Pixel Location address to fetch Next Pixel from CURRENT IMAGE BUFFER 3
Subtract BACKG from Next Pixel brightness
Put result into GATE in the MATRIX
Search TREE NETWORK ENCODER 7 memory for matching MATRIX
If a matching MATRIX is found then move ADDRESS to POINTER in the MATRIX Goto Loop1
Trans: Else move POINTER in MATRIX to HYPERSPACE LIBRARY INDEX CODE NAD
Assemble output superpixel code SP for transmission (see FIG. 2)
Move superpixel code to OUTPUT CODE FIFO BUFFER 8 for transmission Goto Loop

RECEIVER OPERATIONS IN FIG. 7

The operations in the receiver will convert superpixel input codes into changed image patterns in the OUTPUT IMAGE BUFFER 21. The images are then scanned periodically from the image buffer to a television monitor using the OUTPUT SCAN ADDRESS COUNTER 23. Since only the moving portions of the images is transmitted in an autosophy television, superpixel retrieval and output scanning may proceed simultaneously. There is no need to synchronize superpixel transmissions and image output scanning. The image scanning rates in the transmitter and in the receiver need not be identical.

SUPERPIXEL INPUT TO IMAGE OUTPUT RETRIEVAL ROUTINE

NETWORK MEMORY 20: [(64k by 25 bit) NRAM]
MATRIX REGISTER: [GATE (8 bit) ]POINTER (17 bit)]
BACKGROUND BRIGHTNESS: [BACKG (8 bit)]
PIXEL ADDRESS SPAD 28: [PAD (20 bit)]
OUTPUT IMAGE BUFFER 21: [(8 bit) IBRAM]
FILO STACK: [(8 bit by 24 word) FILO]
PIXEL BRIGHTNESS INPUT CODE: [(8 bit) PB]
HYPERSPACE LIBRARY INDEX CODE NADD 25: [(17 bit) NAD]
PIXEL LOCATION ON THE SCREEN CODE PADD 26: [(20 bit) PAD]
SUPERPIXEL INPUT CODE C-IN 24: SP=PB-NAD-PAD
Start: Fetch a next SUPERPIXEL CODE from INPUT CODE FIFO BUFFER 19
Move Center Pixel address PADD to SPIRAL SCANNING DECODER 22
Move PIXEL BRIGHTNESS PB to BACKGROUND BACKG
Move HYPERSPACE LIBRARY INDEX NADD to POINTER in the MATRIX
Loop: Use POINTER as address to fetch new MATRIX from NETWORK MEMORY NRAM
Push new GATE into the FILO STACK
If new POINTER bit 17=1 then Goto Loop
Else push high 8 bit of new POINTER into the FILO STACK
Push low 8 bit of new POINTER into the FILO Stack
Use Center Pixel address PADD as OUTPUT IMAGE BUFFER address
Store PIXEL BRIGHTNESS PB into OUTPUT IMAGE BUFFER 21
Loop1: If FILO STACK is empty then Goto Start
Compute Next Pixel Location using SPIRAL SCANNING SEQUENCE COMPUTATION
Use Next Pixel Location as OUTPUT IMAGE BUFFER address
Pull Pixel Brightness Difference from FILO STACK
Add BACKGROUND BACKG to Pixel Brightness Difference
Store result into OUTPUT IMAGE BUFFER 21 Goto Loop1

SUMMARY OF THE INVENTION

A new autosophy television is based on a new information theory and a mathematical theory of "learning". The same system can be used to compress static images for network communications or for live television systems. Compared with conventional television it has the following novel features:

1. In conventional (Shannon) television the transmission bandwidth is determined by the hardware parameter, such as: image size, resolution and frame rates. The image content or what is actually shown on the screen is irrelevant. A totally random (snow) pattern requires the same bandwidth as a blank screen.

In autosophy television the transmission bandwidth is determined only by the image content, or "novelty" and "movement" within the images. Hardware parameter, such as: image size, resolution or frame rates, become irrelevant. This is expected to result in orders of magnitude lower transmission bandwidth and corresponding lower transmission cost.

2. According to Shannon's information theories any attempt to reduce the transmission bandwidth with image compression must result in inevitable image distortions. The more the image data is compressed the worse the image distortions become until the image quality becomes unacceptable to the user. "Lossy" image compression schemes, such as: JPEG, MPEG or Fractals, attempt to hide the image distortions from the human observer.

Autosophy television provides entirely "lossless" image compression which does not distort the images. Every image frame is complete and may be viewed in start-stop mode or printed on a printer. Since random noise is interpreted as "movement" any increase in noise will increase the transmission bandwidth. Removing noise from the images before transmission will not only improve the image quality but may lead to cheaper transmissions.

3 Conventional television requires a fixed known image standard for rows, columns, resolution, colors and frame rates. Any change in the image hardware parameter requires a new transmission standard.

Autosophy television transmission or storage can be made virtually hardware independent. Every television camera or any television monitor may have its own image size, format or frame rate and yet remain compatible with a common transmission or storage standard. This allows for the free evolution of television technology towards future larger screens and better resolution monitors while maintaining compatibility. Since the standard will remain backward compatible very old records may be displayed on future large screen television.

4 In conventional television an image is continuously scanned for transmission. This is ideal for fixed bandwidth channels, such as the standard 6 Mhz NTSC channel, but not suitable for the newer packet switching networks. In the new packet switching networks, such as: ATM (Asynchronous Transfer Mode), the INTERNET or the Information Superhighway, packets must arrive at the receiver with predictable delays and in predictable order. This requires very high priority network transmissions which are expensive.

In autosophy television only the moving portions of the images are selectively transmitted. Non moving images require no transmissions. This transmission method is ideally suitable for the new packet switching networks. Packets may arrive at the receiver with random delays and in random order without noticeable effects on the image quality.

5 In a television transmission or recording there are bound to be errors which must not unduly impact on the image quality. In the JPEG, MPEG-2 compression standard, for example, any single bit error will cause a break up of the image into random noise until an error recovery code is detected.

In autosophy television any defective data packet transmissions may only lead to a temporary "freezing" of small areas in the output image. Errors will not propagate into the following images. There are three options of error control according to the application. If no error control is used then small sections of the output image may be distorted into random shapes. If defective packets are re-transmitted, for example in video conferencing, then no error effect will occur and the small delay in re-transmitting the packet will not be noticeable to the user. If defective packets are simply discarded then a small portion of the output image may freeze for a limited time.

6 Secure television transmissions may use data encryption. In conventional television or in compressed JPEG, MPEG-2 transmission this requires extra hardware circuits. In autosophy television a secret hyperspace library may be made available only to authorized receivers. This provides a virtually unbreakable encryption code without requiring extra hardware and using the same transmission standard.

7 Lossy image compression in the JPEG, MPEG-2 standard requires very fast computation for the cosine transforms and for motion compensation. Computers operating at such high speed are expensive and as yet nor available in hardware for the new High Definition Television (HDTV). Autosophy television requires no computation and can be built at much lower cost. Encoding speeds of up to 1000 frames per second may become possible.

I claim:

1. An apparatus for reducing the data transmissions of digital image sequences comprising:

means for scanning a digitized input image into an image buffer memory containing a plurality of storage locations for storing the image pixel brightness values;

means for identifying and storing the addresses of changed input pixels, that have changed their brightness value since the previous input image, into an address fifo memory, through a pixel by pixel comparison between the input pixel brightness values and the corresponding pixel brightness values stored in said image buffer memory;

means for directing said addresses of changed input pixels from said address fifo memory to a spiral scanning sequence encoder;

means for generating serial spiral scanning patterns of pixel scanning addresses around said addresses of changed input pixels by said spiral scanning sequence encoder;

means for erasing said addresses of said changed input pixels in said address fifo memory which are identical to the scanning addresses identified by said spiral scanning sequence encoder;

means for retrieving corresponding serial strings of pixel brightness values from said image buffer memory, the pixel location addresses being identified according to said serial spiral scanning pattern generated by said spiral scanning sequence encoder;

means defining a serial hyperspace tree library for encoding serial string of pixel brightness values into serial hyperspace address codes;

means for directing said serial strings of pixel brightness values from said image buffer memory to said serial hyperspace tree library for encoding;

means for generating identifying serial hyperspace address codes from said serial strings of pixel brightness values from said image buffer memory by said serial hyperspace tree library;

means for generating superpixel output codes comprised of a combination of said addresses of changed input pixels and said serial hyperspace address codes.

2. The apparatus according to claim 1 further comprising a third value in the generated superpixel codes, which is equal to the absolute brightness value of the changed pixel in the image buffer memory and which is identified by the address of a changed input pixel, and encoding strings of brightness differences, the difference in brightness between the absolute brightness of the changed input pixel and the following pixels in the spiral scanning sequence, from the serial hyperspace tree library.

3. The apparatus according to claim 1 further means for generating a threshold value from the number of superpixels stored in an output fifo buffer;

means for directing said threshold value to a comparator to adjust the discrimination threshold which determines whether or not the brightness value of an input pixel has changed since the previous input image.

4. An apparatus for the retrieval of sequential images from input superpixel codes each comprising a first code identifying a serial string of pixel brightness values stored in a serial hyperspace tree library and a second code identifying the location of a spiral cluster of pixels in an output image buffer memory comprising:

means defining an output image buffer memory containing a plurality of storage locations to store the pixel brightness values of the retrieved output images;

means for receiving said input superpixel codes;

means for retrieving said serial strings of pixel brightness values from the serial hyperspace tree library using said first code;

means for generating serial spiral strings of pixel location addresses from said second code using a spiral scanning decoder;

means for inserting changes into said output image buffer using said serial strings of pixel brightness values from said serial hyperspace tree library as output image buffer memory data and using said serial spiral strings of said pixel location addresses as output image buffer memory addresses;

means for displaying the content of said output image buffer.

5. The apparatus according to claim 4 further comprising a third value in the input superpixel codes, which is equal to the absolute brightness value of the center pixel in the spiral cluster in the image buffer memory and retrieving strings of brightness differences from the serial hyperspace tree library.

6. An apparatus for generating a serial hyperspace tree library from sequential image sequences by serially scanning spiral clusters of pixels in an input image buffer memory and converting the resulting serial strings of pixel brightness values into identifying string code numbers comprising:

means for scanning a digitized input image into an image buffer memory containing a plurality of storage locations for storing the image pixel brightness values;

means for generating serial strings of pixel location address codes, in spiral pixel clusters, for addressing locations in said image buffer memory using a spiral scanning sequence encoder;

means defining a serial hyperspace tree library for encoding serial strings of pixel brightness values into identifying string code numbers, in which already stored serial strings are converted into identifying string code numbers while new input strings are absorbed automatically to add to the established store of serial strings;

means for generating a serial hyperspace tree library from serial strings of pixel brightness values taken from said image buffer memory using said serial spiral strings of pixel location codes from said spiral scanning sequence encoder to address pixel locations in said image buffer memory;

means for directing the resulting identifying string code numbers to an output station.

7. The apparatus as set forth in claim 6 further comprising a bubble sorting means to identify the most frequently generated identifying string code numbers.

8. The apparatus as set forth in claim 6 further comprising means for retrieving al clusters of image pixels from a serial hyperspace tree library using the identifying string code numbers comprising:

means for receiving the identifying string code numbers;

means for retrieving serial spiral strings of pixel brightness values from the serial hyperspace tree library using said identifying string code numbers;

means defining an image output buffer memory containing a plurality of storage locations for holding the pixel brightness values of the output image;

means defining a spiral scanning decoder for generating serial spiral strings of pixel location codes, in spiral pixel clusters, for addressing locations in said image output buffer memory;

means for storing said serial strings of pixel brightness values in said image output buffer memory using said serial spiral strings of pixel locations codes as memory addresses;

means for directing the output images from the image output buffer memory to an output station.

* * * * *